United States Patent [19]

Vollmer

[11] Patent Number: 4,637,751
[45] Date of Patent: Jan. 20, 1987

[54] COUPLING DEVICE FOR AGRICULTURAL IMPLEMENTS

[75] Inventor: Jürgen Vollmer, Lohmar, Fed. Rep. of Germany

[73] Assignee: Jean Walterscheid GmbH, Lohmar/Rhld., Fed. Rep. of Germany

[21] Appl. No.: 784,838

[22] Filed: Oct. 4, 1985

[30] Foreign Application Priority Data

Oct. 27, 1984 [DE] Fed. Rep. of Germany ....... 3439430

[51] Int. Cl.⁴ .............................................. F16B 7/10
[52] U.S. Cl. .................................... 403/379; 403/377; 403/375; 403/316; 403/11; 411/479; 172/753
[58] Field of Search ............... 411/479, 477, 356, 357, 411/351, 60; 403/379, 378, 377, 376, 375, 315, 316, 318, 319, 11; 172/439, 753

[56] References Cited

U.S. PATENT DOCUMENTS

| | | | |
|---|---|---|---|
| 2,326,317 | 8/1943 | Amtsberg | 403/318 |
| 2,674,169 | 4/1954 | Sawyer | 403/324 X |
| 3,401,951 | 9/1968 | Bloom | 403/379 X |
| 4,460,206 | 7/1984 | Peter | 403/379 X |
| 4,484,849 | 11/1984 | Klimowicz | 411/479 X |

FOREIGN PATENT DOCUMENTS 2948045 1/1982 Fed. Rep. of Germany.

Primary Examiner—Cornelius J. Husar
Assistant Examiner—Joseph A. Fischetti
Attorney, Agent, or Firm—Toren, McGeady and Goldberg

[57] ABSTRACT

A coupling device for enabling a coupling hook to be attached with a coupling pin of a heavy agricultural implement, wherein transverse bores extend through the coupling pin and through a slip-on sleeve and a catch ball on the coupling pin with an axial securement pin extending through the aligned transverse bores, the axial securement pin having its opposite ends extending into an annular groove formed on the inner side of the catch ball aligned with the transverse bore formed therein.

2 Claims, 1 Drawing Figure

COUPLING DEVICE FOR AGRICULTURAL IMPLEMENTS

The present invention relates generally to coupling devices for agricultural implements and more particularly to a device for connecting the lower coupling pin of a heavy agricultural implement to a coupling hook associated with the lower steering arm of a three-point attachment device.

More particularly, the present invention is a device of the type consisting of a catch ball suitable for being slipped onto the coupling pin and provided with a transverse bore for receiving axial securing means. A catch profile pointing outwardly is arranged on the end of a slip-on sleeve mounted on the coupling pin.

A device of the type to which the present invention relates is known in the prior art from DE-PS No. 29 48 045, wherein a catch ball for being received by a lower steering arm associated with a three-point attaching device is slipped onto a coupling pin. In the case of this prior art device, the catch ball, suitable for being slipped onto the coupling pin, is provided with a cylindrical projection which, on the one hand, serves to receive a so-called catch profile and, on the other hand, has been provided with a throughbore for securing the catch ball on the coupling pin.

A disadvantage of a prior art arrangement of this type is that the cylindrical projection limits the size of the catch ball which is to be slipped onto the coupling pin and this in turn limits the size of the implement which may be attached.

Accordingly, it is an object of the invention to provide a coupling device which, with a predetermined design length of the coupling pin, permits the use of an overheavy coupling hook, with the catch ball being secured to the coupling pin so as to be axially affixed, but at the same time, rotatable relative thereto in order to maintain easy swivelling action of heavy implements.

SUMMARY OF THE INVENTION

In accordance with the present invention, the objectives thereof are achieved in that the slip-on sleeve is provided with a transverse bore which corresponds to a transverse bore formed in the coupling pin with the slip-on sleeve being affixed to the coupling pin by a tensioning sleeve which passes through both transverse bores and which projects from both sides of the slip-on sleeve. The catch profile is fixed to the outer end of the slip-on sleeve and the catch ball, which is arranged to be slipped onto the slip-on sleeve by means of a longitudinal throughbore formed in the catch ball, is provided with a transverse bore corresponding to the transverse bores in the catch ball and the slip-on sleeve, but having a greater diameter than these transverse bores. In the region of its transverse bore, the catch ball is provided with an annular groove starting from the longitudinal bore and the ends of the tensioning sleeve projecting on both sides from the slip-on sleeve engage into the annular groove with clearance all around.

In accordance with the invention, it is particularly advantageous that the wear resulting from the rotary movements is accommodated in full within the coupling device so that, if necessary, only the latter has to be replaced.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
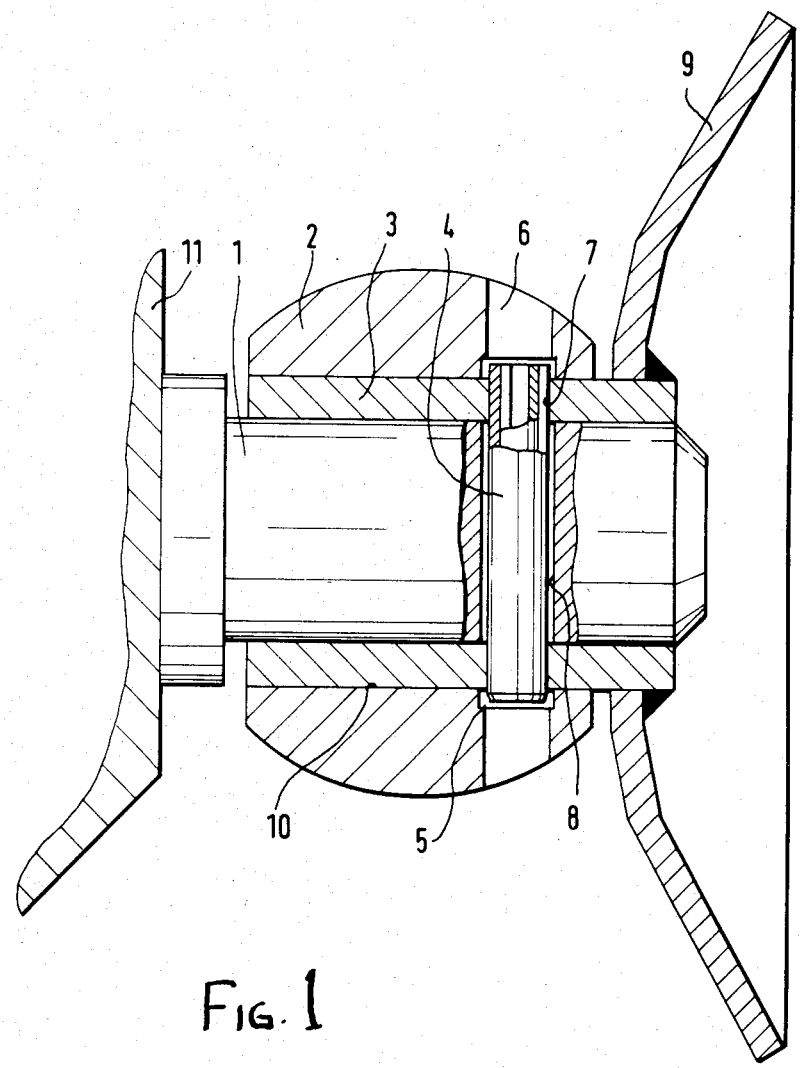
FIG. 1 is a sectional view of a coupling device in accordance with the present invention.

Referring now to FIG. 1 of the drawing, it will be seen that the device of the present invention essentially comprises a coupling pin 1 which is attached with an implement frame 11. A slip-on sleeve 3 is arranged to extend over the coupling pin 1 and a catch profile 9 is affixed to the right-hand end of the slip-on sleeve 3. A catch ball 2 having a longitudinal bore 10 is arranged over the slip-on sleeve 3.

The coupling pin 1 is formed with a transverse bore 8 extending therethrough and the slip-on sleeve 3 is formed with a transverse bore 7 which is in general alignment with the transverse bore 8 in the coupling pin 1.

The catch ball 2 is formed with a transverse bore 6 which has a diameter which is greater than the diameter of the transverse bores 7 and 8.

An annular groove 5 is formed in the catch ball 2 so as to open into the longitudinal bore 10, the groove 5 being in alignment with the transverse bore 6.

Axial securing means in the form of a tensioning sleeve 4 are arranged to extend through the transverse bores 7 and 8, with the tensioning sleeve 4 having its ends extending beyond the slip-on sleeve 3 and into the annular groove 5.

Thus, the coupling device which, as a complete unit, may be slipped onto the coupling pin 1, essentially consists of the slip-on sleeve 3, the catch ball 2 and the catch ball 9 connected to the slip-on sleeve 3. For assembly purposes, the slip-on sleeve 3, together with the slipped-on catch ball 2, is slipped onto the coupling pin 1 attached to the implement frame and the tensioning sleeve 4 is passed through the transverse bore 6 in the catch ball 2 and is passed through the transverse bore 8 in the coupling pin and is inserted under pressure into the transverse bore 7 in the slip-on sleeve 3.

The annular groove 5 provided in the longitudinal bore 10 of the catch ball 2 insures free rotation of the catch ball 2 on the slip-on sleeve 3 while simultaneously securing the catch ball 2 axially onto the slip-on sleeve 3.

Thus, in accordance with the present invention, there is provided a coupling device which, with a predetermined design length of the coupling pin, permits the use of an overheavy coupling hook, with the catch ball, in order to maintain easy swivelling action of the heavy implements, being secured to the coupling pin so as to be axially fixed, but at the same time, relatively rotatable.

In accordance with the invention, the objectives thereof are achieved in that the slip-on sleeve 3 provided with the transverse bore 7 corresponding to the transverse bore 8 of the coupling pin 1 is fixed to the coupling pin 1 by the tensioning sleeve 4 passing through both the transverse bores 7 and 8. The tensioning sleeve 4 projects from both sides of the slip-on sleeve 3 and the catch profile 9 is fixed to the outer end of the slip-on sleeve 3 so that the catch ball 2 which is suitable for being slipped onto the slip-on sleeve 3 by means of a longitudinal throughbore 11 is provided with the transverse bore 6 corresponding to the transverse bores 7 and 8, but having a greater diameter. In the region of the transverse bore 6, there is provided an annular groove 5 starting from the longitudinal bore 10 and the tensioning sleeve 4 with its ends projects on both sides from the slip-on sleeve 3 and engages into the annular groove 5 with clearance all around.

While a specific embodiment of the invention has been shown and described in detail to illustrate the application of the inventive principles, it will be understood that the invention may be embodied otherwise without departing from such principles.

What is claimed is:

1. A coupling device for enabling connection of a coupling hook associated with the lower steering arm of a three-point attaching device with a coupling pin of a heavy agricultural implement comprising:
   a coupling pin connected with a frame of said agricultural implement;
   a slip-on sleeve arranged to be affixed to said coupling pin;
   a catch ball having a longitudinal throughbore for receiving said slip-on sleeve therein;
   a catch profile fixed to an outer end of said slip-on sleeve;
   a first transverse bore in said catch ball;
   a second transverse bore in said slip-on sleeve;
   a third transverse bore in said coupling pin;
   said first transverse bore having a diameter greater than the diameters of said second and third transverse bores;
   axial securing means extending through said second and third transverse bores having ends projecting from both sides of said slip-on sleeve for fixing said slip-on sleeve and said coupling pin together; and
   an annular groove formed in said catch ball opening into said longitudinal throughbore and arranged to receive therein said ends of said securing means extending from said slip-on sleeve with clearance all around.

2. A device according to claim 1, wherein said axial securing means comprise a radially extending sleeve having opposite ends extending into said annular groove.

* * * * *